Oct. 1, 1946.    G. B. WATKINS ET AL    2,408,496
GLASS SURFACING METHOD AND APPARATUS
Filed July 23, 1941    2 Sheets-Sheet 1

Inventors
GEORGE B. WATKINS
CONRAD B. SCHAFER
Frank Fraser
Attorney

Oct. 1, 1946.  G. B. WATKINS ET AL  2,408,496
GLASS SURFACING METHOD AND APPARATUS
Filed July 23, 1941  2 Sheets-Sheet 2

Inventors
GEORGE B. WATKINS.
CONRAD B. SCHAFER.
Frank Fraser
Attorney

Patented Oct. 1, 1946

2,408,496

UNITED STATES PATENT OFFICE 2,408,496

GLASS SURFACING METHOD AND APPARATUS

George B. Watkins, Toledo, Ohio, and Conrad B. Schafer, Charleston, W. Va., assignors to Libbey-Owens-Ford Glass Company, Toledo, Ohio, a corporation of Ohio Application July 23, 1941, Serial No. 403,634

2 Claims. (Cl. 51—283)

The present invention relates broadly to the surfacing (grinding and polishing) of glass and more particularly to an improved method of and apparatus for surfacing relatively small plates of glass.

Generally stated, this invention is primarily concerned with the manufacture of prismatic rear view mirrors for automotive vehicles and the like of the type comprising a plate of glass of substantially triangular shape in cross section having one side thereof plane and perpendicular with respect to the upper and lower edges of the plate and the other side arranged at a slight angle with respect to the plane side. The plane side of the glass plate is provided with a suitable reflecting media such as a silver coat. It has been found that such a mirror is very effective in reducing glare and therefore makes a satisfactory rear view mirror for automotive vehicles and the like.

An important object of the invention is the provision of a novel method of and apparatus for surfacing (grinding and polishing) relatively small plates of glass to render them of substantially triangular shape in cross section and suitable for use in the manufacture of prismatic mirrors of the above character.

Another important object of the invention is the provision of such a method and apparatus whereby a relatively large number of glass plates can be simultaneously ground and polished in a single grinding and polishing operation rapidly, accurately and economically.

A further important object of the invention is the provision of such a method and apparatus wherein the glass plates are supported in such a manner that they will be securely held against displacement during the surfacing operations and also in which first the grinding and then the polishing of the plates may be accomplished without disturbing the relative positions thereof.

Other objects and advantages of the invention will become more apparent during the course of the following description, when taken in connection with the accompanying drawings.

In the drawings, wherein like numerals are employed to designate like parts throughout the same:

Figures 7, 8:
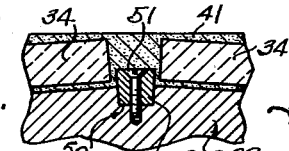
Fig. 7 is a transverse section of a mirror formed from one of the glass plates.
Fig. 8 is a detail sectional view of a modified form of removable top.

With reference now to the drawings, there is shown in Fig. 7 a prismatic rear view mirror for automotive vehicles comprising a glass plate 10 in the form of a triangular prismoid having a plane back surface 11 extending perpendicular with respect to the upper and lower edges 12 and 13 thereof and a front surface 14 which is arranged at a slight angle with respect to the back surface 11. The back surface 11 is provided with any suitable type of reflecting media, such as a silver coat 15, covered by the usual protective backing 16 if desired.

In Figs. 1 to 6 inclusive is illustrated a preferred form of apparatus for surfacing a plurality of glass blanks to produce the triangular mirror plates 10. The forming of the mirror plates is accomplished in three principal operations consisting of (1) properly mounting the glass blanks from which the mirror plates are to be made; (2) grinding the blanks to form mirror plates of the desired triangular shape in cross section; and (3) polishing the ground surfaces of the mirror plates. The mounting of the glass blanks may be carried out upon any suitable table or the like 17 (Fig. 1), after which they are transferred to the grinding machine 18 (Fig. 1a) and acted upon by the grinding runner 19 rotatably carried at the lower end of a vertical shaft 20. After being ground, the mirror plates are transferred to the polishing machine 21 (Fig. 1b) upon which the ground surfaces are polished by the freely rotatable polishing runners 22 carried by a frame 23 mounted upon a vertical shaft 24.

Figure 3:
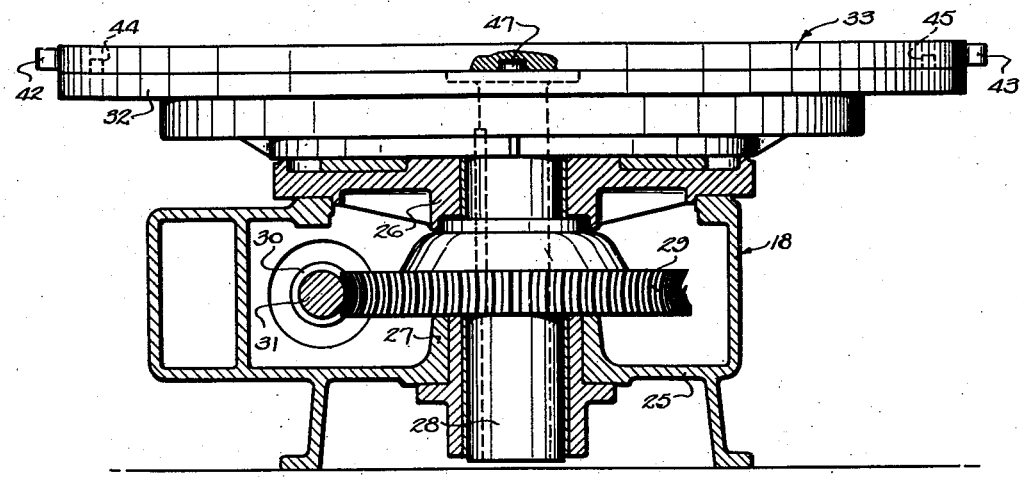
Fig. 3 is a side elevation, partially in section, of a grinding or polishing machine showing the removable top associated therewith.

The grinding and polishing machines 18 and 21 may be of the construction illustrated in Fig. 3 comprising a supporting housing 25 provided therein with the spaced upper and lower bearings 26 and 27 in which is journaled a vertical shaft 28 having keyed thereto a worm gear 29. Meshing with the worm gear 29 is a worm 30 keyed to a drive shaft 31 driven from a suitable motor.

Figure 5:
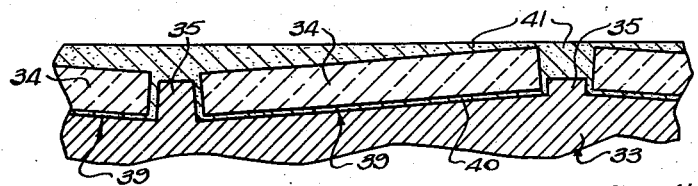
Fig. 5 is a detail sectional view showing the manner in which the glass plates are secured upon the removable top.

Keyed to the upper end of the vertical shaft 28 of the grinding or polishing machine is a circular supporting plate 32 upon which is supported the removable top 33 carrying the glass blanks 34 to be surfaced (Fig. 5). The removable top 33 consists of a relatively large metal disk provided upon its upper surface with a plurality of spaced, parallel ribs 35 defining therebetween the relatively long, narrow recesses 36. That is to say, the ribs 35 constitute the opposite side walls of the recesses, while the outer ends of the said recesses may be closed by a vertical rib 37 extending around the perimeter of the top 33. Also, if desired, the longer recesses 36 can be divided intermediate their ends by a vertical rib 38 arranged at right angles to the ribs 35.

Figure 4:
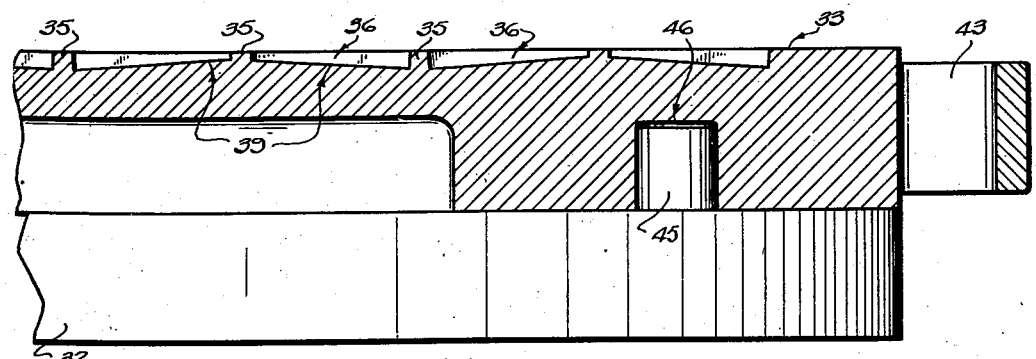
Fig. 4 is an enlarged sectional view showing the manner in which the removable top is held upon the machine.

The bottom 39 of each recess 36 inclines downwardly from one rib 35 to an adjacent rib 35, with the angle of inclination thereof corresponding to the angle of the front surface 14 of the mirror plate 10. Although not essential, it is preferred that the bottom 39 of adjacent recesses 36 incline downwardly in opposite directions as shown in Fig. 4.

The glass blanks 34 consist of relatively long, narrow strips of glass and, as illustrated in Fig. 5, these blanks are rectangular in cross section, having their opposite surfaces plane and parallel with one another. Consequently, when the blanks are placed within the recesses 36 in the table top they are disposed in an inclined position. When mounting the glass blanks 34 within the recesses 36, a relatively thin layer of suitable plaster, such as plaster of Paris or the like 40, is first placed within the bottom of each recess and the glass blank laid thereupon with the bottom surface of the glass blank being parallel with the bottom of the respective recess. Additional plaster 41 may then be spread over the upper surfaces of the glass blanks to completely cover the same and to also completely fill in the spaces between adjacent blanks, the said blanks being firmly held in place upon setting of the plaster.

Figures 1, 1A, 1B:
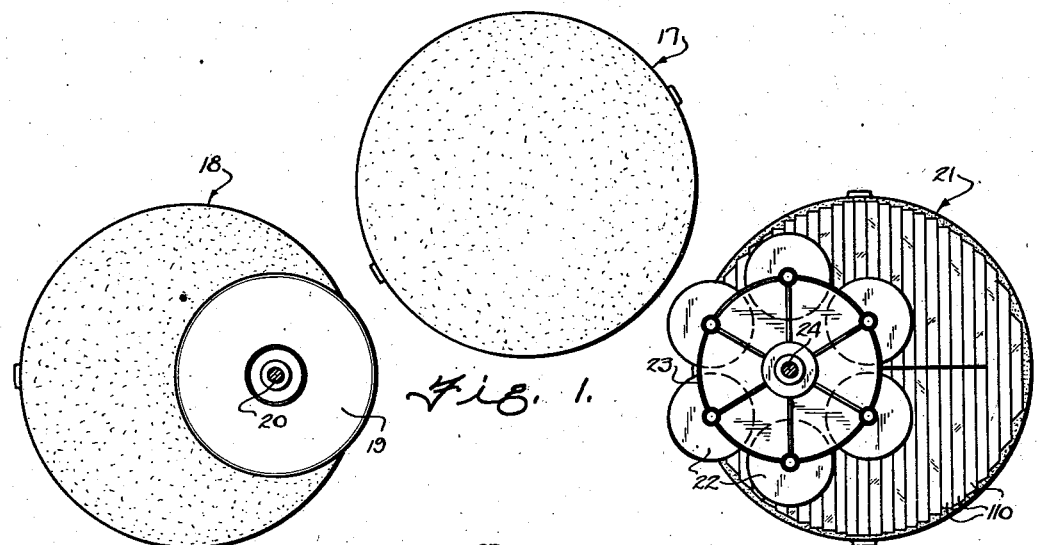
Figs. 1, 1a and 1b are diagrammatic plan views illustrating respectively an assembly table, a grinding machine and a polishing machine on which the assembling of the glass plates and the subsequent grinding and polishing thereof may be accomplished.
Figure 2:
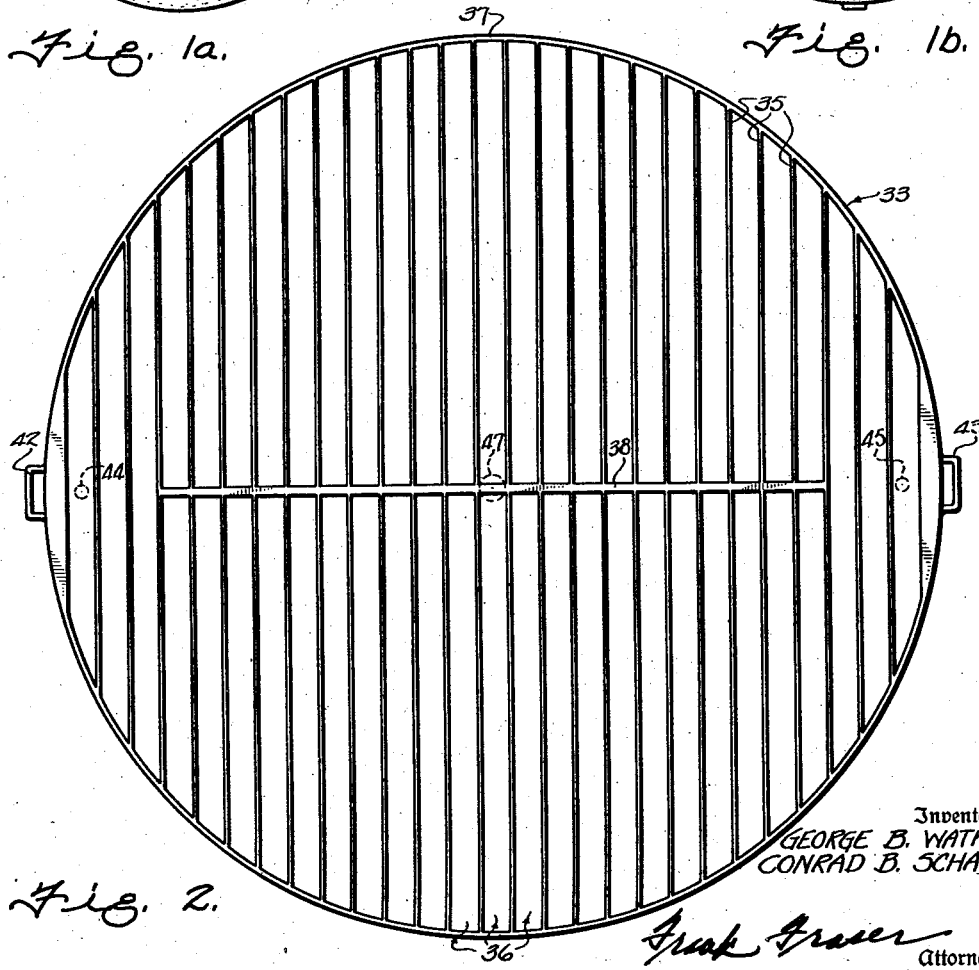
Fig. 2 is a plan view of the removable top for supporting the glass plates during grinding and polishing.

The mounting of the glass blanks 34 upon the table top 33 may be accomplished while said table top is supported upon a suitable assembly table as indicated at 17 in Fig. 1, after which the top, with the glass blanks, is transferred to the grinding machine 18. To facilitate the handling of the top, it may be provided at diametrically opposite points with handles 42 and 43. Also, to facilitate the positioning of the top upon the grinding machine, the supporting plate 32 of the machine is provided at diametrically opposite points with vertical dowels 44 and 45 which are received within recesses 46 formed in the under side of the top. To further assist in securing the removable top 33 upon the supporting plate 32, the vertical shaft 28 of the machine may be provided at its upper end with a reduced cylindrical extension 47 received within a recess in the under surface of said removable top.

Figure 6:
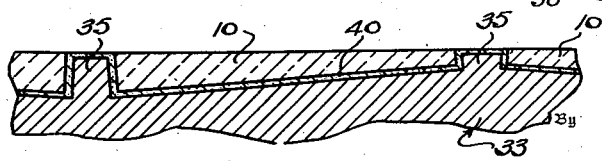
Fig. 6 is a similar view showing the glass plates after being ground and polished.

Upon grinding of the glass blanks 34, the inclined upper surfaces thereof will be gradually ground away until said surfaces are flat and disposed in a common horizontal plane, as shown in Fig. 6. This will result in the upper surface of each glass blank being at a slight angle to the bottom surface thereof so that the upper surface will constitute the front surface 14 of the mirror plate 10 and the bottom surface the plane back surface 11 of said mirror plate which is perpendicular with respect to the upper and lower edges 12 and 13.

After the glass blanks have been properly ground, the removable top 33 is transferred from the grinding machine 18 to the polishing machine 21 and the upper surfaces thereof smoothed and polished. After polishing, the glass blanks are removed from the recesses 36 in the top 33 and cut transversely into mirror plates of the desired length. The top and bottom and end edges of the mirror plates are then preferably ground and finished, after which the plates are properly washed and cleaned and the reflecting media 15 to protective backing 16 then applied and the plane surface 11 to form the completed mirror shown in Fig. 7.

In Fig. 8 is illustrated a modified form of removable top 33 in which the ribs 49 corresponding to the ribs 35 are removable. The ribs 49 consist of separate strips seated within grooves 50 in the upper surface of the top 33 and removably secured therein by screws 51. If desired, the rib 37 extending around the perimeter of the top 33 may also be made removable to facilitate handling of the glass plates.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. The method of forming mirror plates substantially triangular in cross section, comprising supporting a plurality of glass blanks which are substantially rectangular in cross section in a horizontally inclined position, covering said blanks with a bedding material to fill the spaces between adjacent blanks and to provide a flat unbroken surface thereabove, and then simultaneously grinding away the bedding material and the upper inclined surfaces of the glass blanks until said upper surfaces are in a common horizontal plane and at an angle with respect to the bottom surfaces thereof.

2. The method of forming mirror plates substantially triangular in cross section, comprising supporting a plurality of glass blanks which are substantially rectangular in cross section in a horizontally inclined position, covering said blanks with a bedding material to fill the spaces between adjacent blanks and to provide a flat unbroken surface thereabove, then simultaneously grinding away the bedding material and the upper inclined surfaces of the glass blanks until said upper surfaces are in a common horizontal plane and at an angle with respect to the bottom surfaces thereof, and then polishing said ground surfaces without changing the relative positions of the glass blanks.

GEORGE B. WATKINS.
CONRAD B. SCHAFER.